Figure 1:
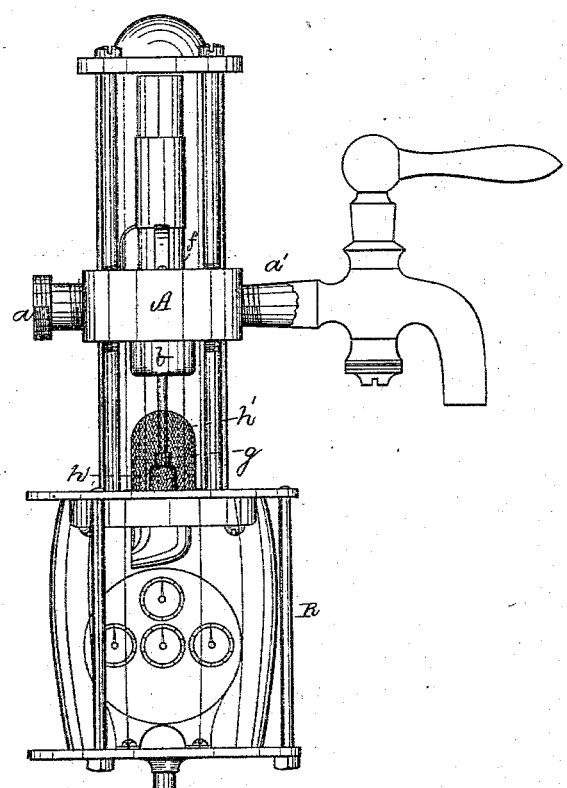

(No Model.)

C. H. BACON.
APPARATUS FOR MEASURING FLUIDS.

No. 289,058. Patented Nov. 27, 1883.

Witnesses.
J. E. Maynadier
J. R. Snow

Inventor.
Charles Henry Bacon

UNITED STATES PATENT OFFICE.

CHARLES H. BACON, OF BOSTON, MASSACHUSETTS, ASSIGNOR OF ONE-HALF TO ARTHUR FULLER, OF SAME PLACE, EUSTIS NEWHALL, OF LYNN, AND JOHN H. STURGIS, OF BROOKLINE, MASSACHUSETTS.

APPARATUS FOR MEASURING FLUIDS.

SPECIFICATION forming part of Letters Patent No. 289,058, dated November 27, 1883.

Application filed February 21, 1883. (No model.)

*To all whom it may concern:*

Be it known that I, CHARLES HENRY BACON, of Boston, in the county of Suffolk and State of Massachusetts, have invented a new and useful Improvement in Water-Meters, of which the following is a specification.

My invention relates to improvements in that class of meters for measuring water in which the quantity delivered is ascertained by measuring a portion bearing a known proportion to the quantity delivered.

The main object of my invention is to adapt such meters to accurately register the water drawn from a street-main to supply a house, however the pressure or head in the street-main may vary, and no matter what may be the rate of flow from the street-main to the house.

The object of my invention is to provide an apparatus in which the water delivered to the house is made to flow through one port, and the water that is measured is made to flow to the measuring device through another port by the same pressure; the measuring device is kept free from all back-pressure of water by an outlet to the atmosphere; and the valve through which the water that is delivered to the house passes is controlled by the flow of the water, and itself controls the other valve; and the invention consists in the combination, in a water-meter, of three chambers, the first chamber communicating directly with the street-main and containing two outlet-ports of different areas with their valves, the second chamber communicating directly with the house-pipe and with the first chamber through the larger port, and the third chamber open to the atmosphere, containing the measuring device, and communicating with the first chamber through the smaller port. In the Patent No. 91,374, of 1869, a differential-valve meter is shown; but the smaller port in that meter does not open out of the chamber in direct communication with the source of supply of the liquid, but is placed in a chamber corresponding with the second chamber of my meter, to which the liquid is admitted through the larger valve, and from which chamber the water passes to the discharge-pipe. In this construction it is evident that the pressure on the smaller valve must vary in proportion to the velocity with which the fluid flows through the chamber on the house side of the meter, (which varies as one or a number of faucets in the house are turned on,) and consequently the amount of water passing through the smaller valve will correspondingly vary, and therefore such a meter is unreliable for a correct measurement, for as the measurement of the water which escapes out of the chamber on the house side through the smaller valve is the only means of ascertaining how much has passed into that chamber through the larger valve, even a small amount of variation in the former, caused by the variations in pressure in the chamber on the house side, will make a material difference in the latter. In my device, as both valves open out of the chamber on the street side, the smaller valve is always subject to the same pressure as the larger valve. It does not receive its fluid through the larger valve, the ports of both valves communicating with the source of supply, and consequently the amount of water passing out into the atmosphere after passing through the smaller valve must always bear exactly the same proportion to that passing through the larger valve.

My improved meter is illustrated in the accompanying drawings, making part of this specification, in which—

Figure 2:
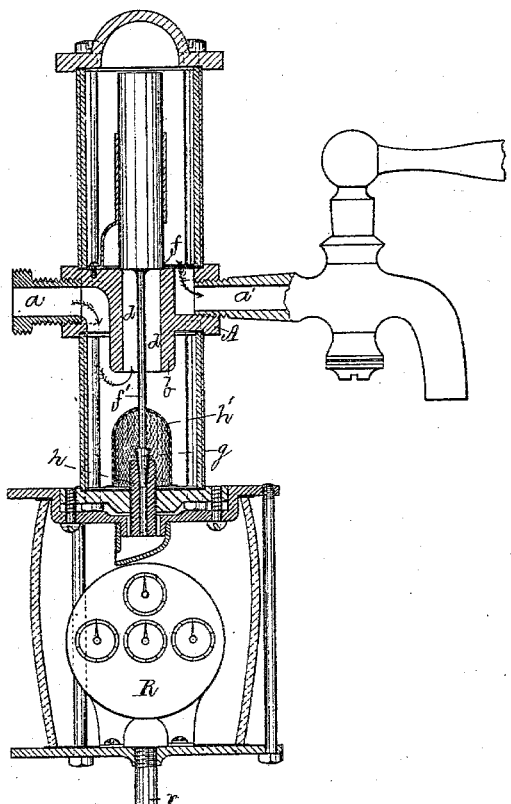

Figure 1 is an elevation, and Fig. 2 a lengthwise section.

A is a vessel divided into two chambers by a partition, $b$, which has a port, $d$, through it, forming a communication between the two chambers. The lower chamber on the street side of the meter is connected by a pipe, $a$, to the reservoir or source of supply of the liquid, and is provided with ports $d$ and $h$. Both ports $d$ and $h$ are always in direct connection with the supply-pipe, and none of the fluid passing through one passes through the other, nor does any of the fluid passing through port $h$ go to the outlet $a'$ of the meter. The port $d$ is provided with a valve, $f$, and the port $h$ with a valve, $g$, both always subject to the full pressure of the water-supply, but one leading through the chamber on the house side of the meter to the outlet $a'$, while the other leads from the chamber on the street side of the meter through the measuring-chamber to its own outlet, and does not lead into the outlet $a'$. The upper chamber of the vessel A, on the house side of the meter, communicates with the supply-pipe $a'$, leading to one or more faucets. This outlet-pipe $a'$ is supplied solely through the port $d$, as none of the water which passes through the port $h$ passes through the outlet-pipe $a'$, my meter differing in this respect from all other differential-valve meters, excepting only that described in the patent above referred to, and differing from the meter described in that patent, in that the port $h$ leads from the chamber on the street side of the partition $b$, instead of from the chamber on the house side of that partition, as in that patent. It will be apparent that on opening a faucet and causing the fluid to flow through the pipe $a'$ the pressure on the house side of valve $f$ will be reduced, and the pressure in the lower chamber, acting on its other or street side, will cause it to rise from its seat and carry with it the valve $g$. The fluid escaping through the port $h$ is measured, and as it bears a known and in my improved meter an unvarying proportion to the fluid escaping through the port $d$ and supply-pipe $a'$, the volume discharged through the pipe $a'$ can be readily and accurately ascertained.

I am aware of Patent No. 185,001, of 1876, for measuring-faucets; but in that device the valves are operated by hand, and not by the flow of the water.

I am also aware that differential-valve meters have had both valves subjected to the same pressure and operated by the flow of the water; but in all such meters it has been attempted to cause the liquid passing through the smaller valve to enter the discharge-pipe and pass out of the meter with the liquid passing through the larger valve. In such meters the back pressure from the body of liquid on the house side so interferes with the flow of the smaller portion of the liquid as to make their action unreliable.

I disclaim all meters in which the valves are not operated by the flow of the water, and also disclaim all in which the liquid passing through the measuring device flows through the discharge-pipe of the meter, as well as all that is shown in Patent No. 91,374, of 1869.

I claim as my invention—

In a differential-valve meter, the two chambers separated by a partition, one chamber communicating with a water-supply by an inlet-pipe, and having within it the delivery and measuring valves, the other communicating with the house by a discharge-pipe, in combination with the measuring-chamber having the measuring valve, and means for measuring and discharging the water to waste and without its return to the house-chamber or its discharge-pipe, all constructed and arranged substantially as set forth and described.

CHARLES H. BACON.

Witnesses:
J. E. MAYNADIER,
ARTHUR FULLER.